Patented June 10, 1930

1,763,451

UNITED STATES PATENT OFFICE

HERMANN WEBER, OF REISHOLZ, NEAR DUSSELDORF, AND FERNANDO NIEMEYER, OF HOLTHAUSEN, NEAR DUSSELDORF, GERMANY

TREATING GLYCERIN

No Drawing. Application filed January 12, 1927, Serial No. 160,767, and in Germany January 26, 1926.

This invention has reference to a process of treatment of glycerin by means of which the formation of diglycerin is induced therein, while the formation of other generally objectionable polyglycerins and polymerization products is avoided. It is a well known fact that glycerin upon being heated for some time becomes polymerized and that this reaction may be accelerated by the addition of catalytically acting substances. With this method there is however the great difficulty that the glycerin becomes decomposed thereby, and assumes a very noxious odor and becomes discolorized and its marketable qualities are thereby impaired. Besides, there is the additional very serious objection that not only the valuable diglycerin is formed, but very considerable amounts of polyglycerins are formed and the presence of which, as is well known, is highly objectionable in the nitration of glycerin; and the presence of this impurity also interferes in particular with the stability of the nitroglycerin obtained. Nor is the formation of these polymerization products avoided by the addition of substances containing free alkali, as heretofore suggested, such as sodium acetate.

Now it has been ascertained in the course of our experiments that the formation of polyglycerins beyond the desirable formation of diglycerin may be substantially avoided by the addition to the glycerin of compounds containing oxide of silicon, which when heated with the glycerin for a long time at temperatures considerably lower than the boiling point of the glycerin, produce by means of hydrolytic or thermic decomposition a weak basic action. In particular, oxides of silicon, such as f. i. silica gel or alkali metal silicates, such as water-glass, have been found adapted to the use as accelerators in this reaction. It has been ascertained that these compounds of silicon contribute largely to the acceleration of the reaction, without giving rise to the disturbing and objectionable action and to the formation of higher polymerized glycerins other than diglycerin.

The compounds referred to present, moreover, the great advantage of being only slightly soluble in glycerin or being easily separated therefrom. On the other hand, on account of their property of absorbing coloring agents and particles and of taking on any existing odors they are also an efficient means of clarifying and brightening the glycerin. The action of the compounds of silicon may be further increased by vigorously stirring the glycerin-mixture during the heating. This object may be accomplished either by the employment of an agitator or by the introduction of indifferent gases, such as for instance, carbonic acid, nitrogen, hydrogen and the like, these gases being passed, preferably under pressure, through the heated glycerin-mixture.

The term "water-glass," as used in this specification and claims is intended to cover both the solid as well as the dissolved, and the hydrated and the crystallized silicates of sodium and potassium; and it should also be noted that the proportion of silica to the alkali may be different in the kinds of water-glass employed in this invention.

Example 1

To dynamite-glycerin from 0.2 to 0.25% of hydrated water-glass are added of the following composition:—

22.5% $Na_2O$, 58.8% $SiO_2$ and 18.7% $H_2O$. This mixture is heated in a closed vessel provided with a short reflux-condenser and a vapor-pipe connected thereto to a temperature of 220 to 240° centigrade. After the heating has been continued for six hours, a filtered sample contains approximately 86% glycerin, 13% diglycerin, 1% distillation residue and 0.05% ash.

Example 2

Add to dynamite-glycerin 0.25% crystallized sodium-metasilicate ($Na_2SiO_3.9aq.$) and proceed in accordance with Example 1. The resulting product contains about 80% glycerin, 18% diglycerin, 2% distillation residue and 0.1% ash.

The invention having been described in its broad aspects, it should be understood that it is not restricted to the particular substances, quantities and conditions hereinbefore stated by way of exemplification of its principles only, but that it is susceptible of modifications and changes within the scope and spirit of the claims, as hereunto appended.

We claim:—

1. The process of treating glycerin, which consists in heating glycerin for from two to six hours at about 220 to 240 degrees centigrade with alkali metal silicates.

2. The process of treating glycerin, which consists in heating glycerin for from two to six hours at about 220 to 240 degrees centigrade with less than 1% of alkali metal silicates.

3. The process of treating glycerin, which consists in heating glycerin for from two to six hours at about 220 to 240 degrees centigrade with less than 1% of water-glass.

4. The process of treating glycerin which consists in heating glycerin for from two to six hours at about 220 to 240 degrees centigrade with less than 1% of hydrated water-glass.

In testimony whereof we have hereunto set our hands.

HERMANN WEBER.
FERNANDO NIEMEYER.